July 23, 1974 J. A. AMANN 3,825,463
SECTIONALIZED LAMINATE STRIP STRUCTURE
Filed April 30, 1973 5 Sheets-Sheet 1

United States Patent Office 3,825,463
Patented July 23, 1974

3,825,463
SECTIONALIZED LAMINATE STRIP STRUCTURE
John A. Amann, 19 Alemeda Place,
Mount Vernon, N.Y. 10552
Filed Apr. 30, 1973, Ser. No. 355,588
Int. Cl. B32b 7/06, 3/16
U.S. Cl. 161—36                              10 Claims

ABSTRACT OF THE DISCLOSURE

The present invention relates to a process for continuously manufacturing a sectionalized laminate strip structure comprising a series of individually dispensable pressure-sensitive adhesive backed sheet articles, the resulting product, and improvements in the apparatus for dispensing same.

DESCRIPTION OF THE INVENTION

The present invention relates to a process for continuously manufacturing a sectionalized laminate strip structure comprising a series of individually dispensable pressure-sensitive adhesive backed sheet articles, the resulting product, and improvements in the apparatus for dispensing same.

More particularly the construction of the present invention comprises a sectionalized laminate strip structure having a substantially flexible first layer consisting of a longitudinal web or sheet material coated with pressure sensitive adhesive on one side, in combination with a second layer comprising a substantially flexible, releasably coated web, sheet or other backing material wherein said release coating is in adherent contact with said pressure sensitive adhesive.

The construction of the sectionalized laminate strip structure is further characterized by alternate cuts or perforations of predetermined spacing across the full width of each layer which result in weakened or severed portions on said first layer and said second layer, with the result that the cuts or perforations are staggered and do not fall in line with each other thereby permitting the integrity of the sectionalized laminate strip strucuture to remain intact. The cuts or perforations in each layer are preferably made normal to the edge of each layer, however the cuts or perforations need not necessarily be parallel to each other. Other configurations of cuts or perforations through either layer may also be made provided they permit the workability of the invention and do not disturb the integrity of the sectionalized laminate strip structure.

DESCRIPTION OF THE PREFERRED EMBODIMENT

The present invention is applicable to the manufacture of a wide variety of pressure-sensitive adhesive-coated flexible sheet articles such as labels, markers, tabs, bandages, or tape splices. For the purposes of illustrating the process and resulting product of the invention it will be described in conjunction with the manufacture of a metallic faced pressure sensitive adhesive coated splicing tab of the type used in joining together adjacent ends of a sound recording tape.

Figure 1:
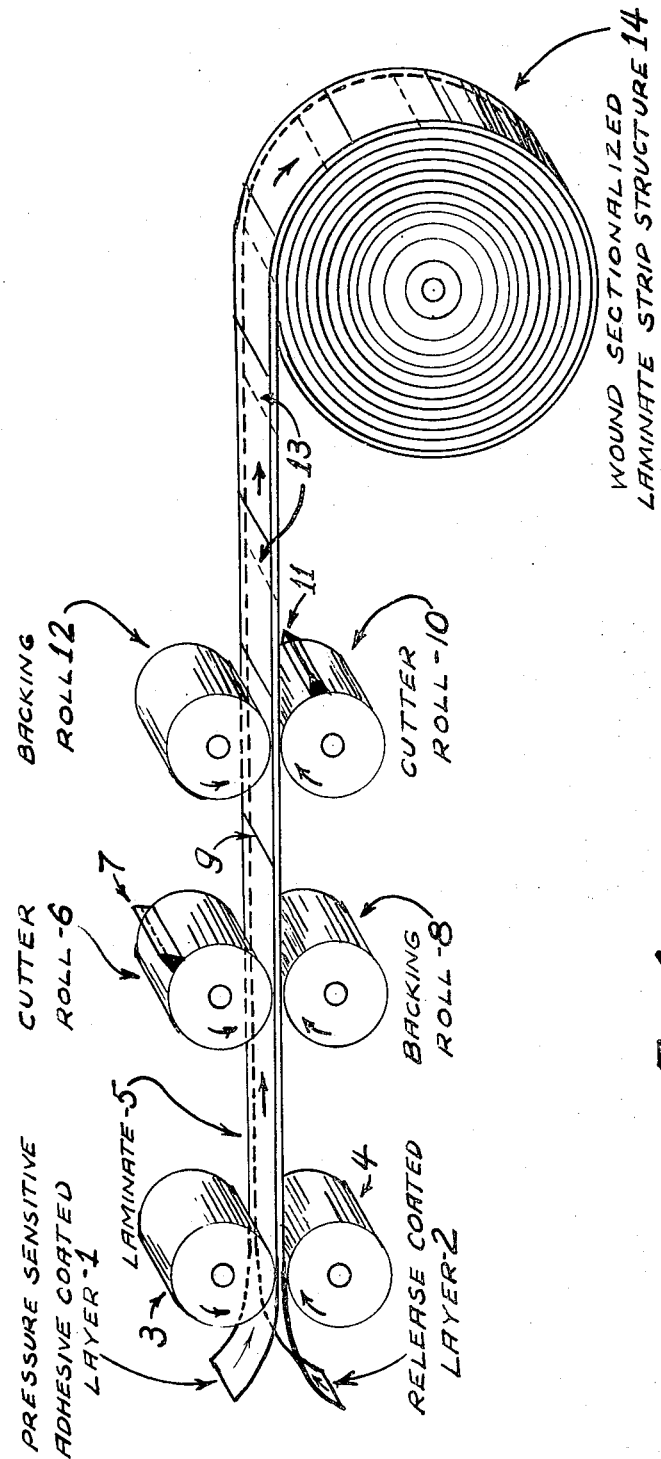
FIG. 1 is a schematic perspective view illustrative of carrying out the manufacturing process of the invention.

FIG. 1 shows a first or upper layer 1 which comprises substantially flexible pressure sensitive adhesive coated tape, and a substantially flexible second or bottom layer 2 having on one surface a release coating, the release coating of said layer 2 being in adherent contact with the pressure sensitive adhesive coating of layer 1. Other substantially flexible materials, not having a specially applied release coating, but having inherent or natural release properties may also be used for layer 2. Lamination, as shown in FIG. 1, is achieved by simultaneously passing layer 1 and layer 2 both of which are of equal width, between laminating rolls 3 and 4 which are adjusted to exert pressure against the exposed (outer) surface of layers 1 and 2, forcing said layers into adherent contact with each other. Rolls 3 and 4 are driven by an external power source (not specifically shown) and serve the dual function of laminating or combining layers 1 and 2 and moving laminate 5 formed therefrom to a cutter stand comprising cutter roll 6 with cutting edge 7 opposed by backing roll. For simplicity of illustration, cutter roll 6 is shown as being formed with but a single cutting edge 7, however, it will be appreciated that a plurality of such cutting edges may be present on cutter roll 6 and these may take the form of helical or other configurations rather than straight cutting edges. As the laminate 5 is passed between cutter roll 6 with cutting edge 7 and backing roll 8, cutting edge 7 is adapted to cut transversely only the pressure sensitive adhesive coated tape layer 1 at specified intervals longitudinally along said layer 1 thus producing a plurality of transverse cuts 9 in said layer 1 but leaving the releasably coated layer 2 intact. The angle of the transverse cuts 9 with respect to the longitudinal edges of said layer 1 is preferred to be between 90 degrees and 30 degrees, but may be made at any other practical angle. As a result of the cuts or perforations, pressure sensitive adhesive coated tape layer 1 is divided into a plurality of adjacent discrete sheet sections each of which is in abutment with the previously cut sheet section.

The partially processed laminate 5 is then advanced to a second cutter stand, which is in line with the first cutter stand, said second cutter stand comprising cutter roll 10 with cutting edge opposed by backing roll 12. Laminate 5 is passed between cutter roll 10 having a cutting edge 11 and backing roll 12. Cutter roll 10 with cutting edge 11 is adapted to make cuts or perforations 13 only on the releasably coated layer 2. Such cuts or perforations are preferably made transversely on said layer to form a plurality of adjoining discrete sheet sections in the same fashion or manner that the pressure sensitive adhesive coated tape layer 1 was transversely cut or perforated by cutter roll 6 with cutting edge 7.

Cutter roll 6 with cutting edge 7 and cutter roll 10 with cutting edge 11 are synchronized with respect to each other and are designed to produce sheet sections of the same length in layers 1 and 2 respectively, and are adjusted so that the cuts are perforations performed on layer 1 will not be in alignment with the cuts performed on layer 2 threby resulting in a sectionalized laminate strip structure which retains its integrity because each sheet section in upper layer 1 overlaps and is in adherent contact with a portion of two adjoining sheet sections in bottom layer 2. Conversely, every sheet section in bottom layer 2 overlaps and is in adherent contact with a portion of two adjoining sheet sections in upper layer 1.

The resulting sectionalized laminate strip structure is then preferably wound for later use with upper layer 1 of sectionalized pressure sensitive adhesive coated tape on the outer side on roll 14.

An important feature in the workability of the invention is the degree of adhesion of the pressure sensitive adhesive coated layer 1 to the release coating of releasably coated layer 2, after they have been combined to form the laminate 5. The materials chosen for layers 1 and 2 are sufficiently adherent to each other to maintain the integrity of the sectionalized laminate strip structure during the manufacturing process and yet the releasably coated bottom layer is capable of being released easily from the pressure sensitive adhesive coated layer on top after said layers have been cut into sections.

Figure 2:
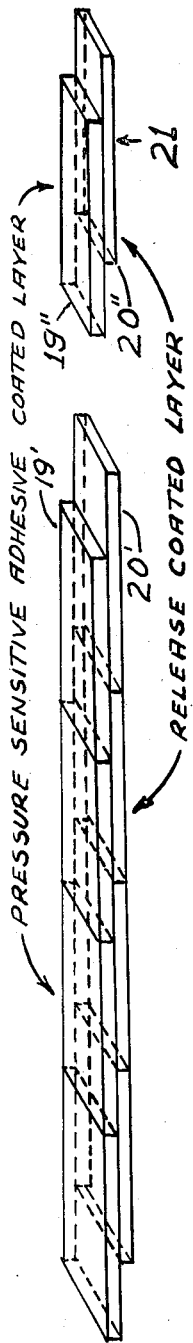
FIG. 2 is a perspective view of the sectionalized laminate strip structure illustrating the individually dispensible laminated sheet articles having cuts normal to the edge of said laminate.

The sequence of cutting operations performed on layers 1 and 2 of the laminate 5 as described above, may be reversed without impairing the workability of the invention. Another important feature in the workability of the invention illustrated in FIG. 2 is the amount of overlap of the pressure sensitive adhesive coated section 19" over the releasably coated sheet section 20" which together form sheet article 21. The overlap of the two layers is controlled as described above (and as shown in FIG. 1) by the synchronization of cutter roll 6 with cutter roll 10 and in part by adjusting the position of cutting edge 7 on cutter roll 6 with respect to cutting edge 11 on cutter roll 10. Article 21 comprises section 19" which is linearly and rearwardly displaced on top of the releasably coted sheet section 20". Generally the amount of overlap of the layers along their longitudinal axes as typified by article 21 is such that a substantial portion, preferably more than 50% but less than 100%, more preferably more than 60% but less than 90% of the area of the pressure sensitive adhesive coated sheet section 19" is in adherent contact with the releasably coated sheet section 20", the balance having been in contact with adjoining section 20' prior to removal. The exposed portion of releasably coated sheet section 20' may be grasped and removed from the remaining sectionalized laminated strip structure to obtain an article like article 21.

If desired, variations in the manufacturing process shown in FIG. 1 may be used and these are to be considered as part of this invention.

Means (not specifically shown) for punching holes into the laminate 5 (FIG. 1) or into one or both layers 1 and 2 for decorative or other functional purposes such as eventual dispensability of roll 14 with a sprocket drive, may be incorporated in the manufacturing process.

Multiple laminates 5 of the same or of varying widths may be run side by side through the manufacturing process, and wound on a multiple number of rolls 14.

Laminate 5 may be slit into a number of narrower laminates or sectionalized laminates by the incorporation of a slitting device (as it is commonly known to the trade) in the manufacturing process.

Alternate strips of the sectionalized pressure sensitive adhesive coated layer 1 may be mechanically or otherwise removed after the transverse cutting operation on layer 1 by cutter roll 6. If this variation is used, cutting edge 11 on cutter roll 10 is then adjusted or synchronized with cutter roll 6 so that the transverse cuts on releasably coated layer 2 fall in the area that meet the prescribed above-mentioned requirements of overlap.

The aforesaid procedure allows for varying the length of releasably coated sheet section 20" (FIG. 2) with respect to the length of the pressure sensitive adhesive coated sheet section 19".

Again referring to FIG. 1, in a different variation the manufacturing process initially uses only the release coated facing upward. Strips of pressure sensitive adhesive coated tape of predetermined width, with the length of the strip equal to the width of releasably coated layer 2 and with the adhesive side of the tape facing the release coating on layer 2, are laid transversely by mechanical or other means in a precisely spaced manner or pattern onto the releasably coated layer 2. This structure is then passed between laminating rolls 3 and 4 to achieve adherent contact of the tape strips to the releasably coated layer 2. The first cutter stand is not required in this part of the manufacturing process and is left inoperative merely by removing cutter roll 6. The modified laminate structure as described above is then passed between cutter roll 10 with cutting edge 11 and backing roll 12 wherein the releasably coated layer 2 is then transversely cut to meet the prescribed above-mentioned requirements of overlap of the sheet sections in sectionalized layer 1 with respect to the sheet sections in sectionalized layer 2.

When the manufacturing process is carried out as described above, the resulting roll of sectionalized laminated strip structure will, upon dispensing in the hereinafter described dispenser, yield a series of individually removable laminated sheet articles which permit the application of the pressure sensitive adhesive coated sheet section in a convenient manner without contamination of the adhesive by the user.

Figure 3:
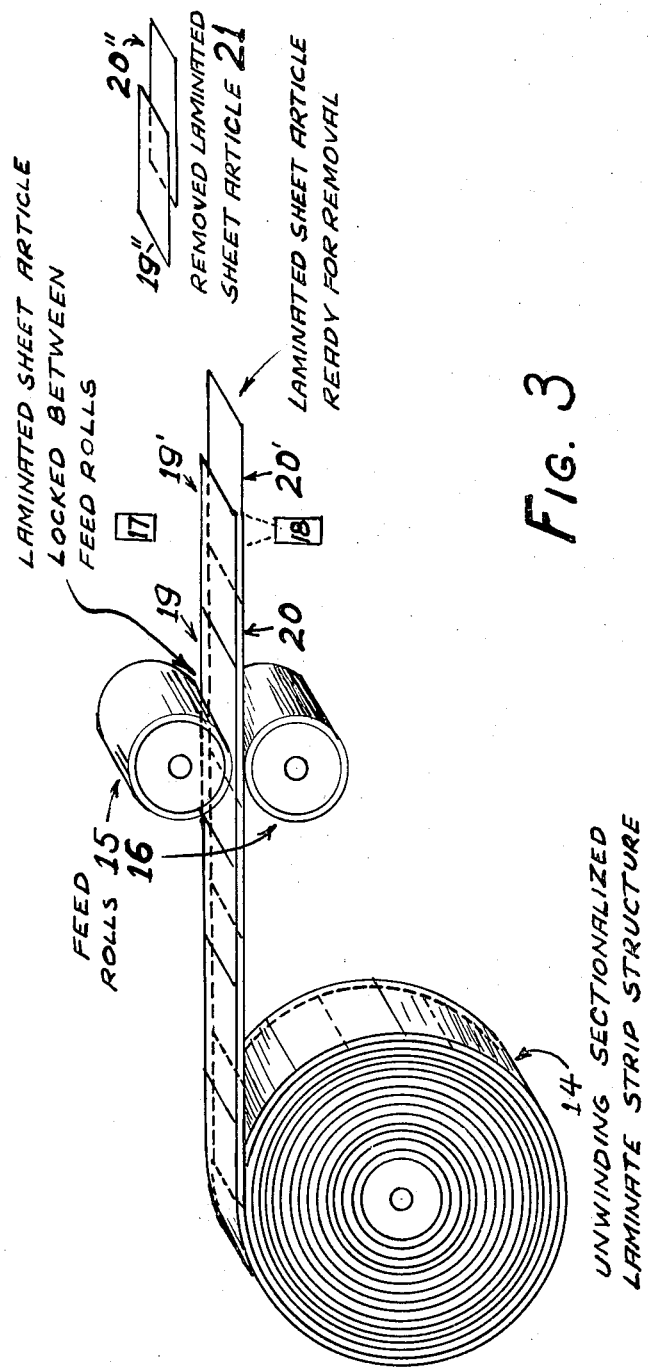
FIG. 3 is a schematic perspective view illustrative of an apparatus adapted for dispensing the sectionalized laminat strip structure.

FIG. 3 illustrates an apparatus for dispensing a roll of laminated strip structure 14 automatically using feed rolls 15 and 16 to advance the sectionalized laminate strip structure. Feed rolls 15, 16 are covered with a high friction material such as rubber, and by adjusting them to exert pressure against the outer surfaces of the sectionalized laminate strip structure will advance it by friction.

Other means, such as a sprocket drive may be utilized instead of feed rolls 15, 16 to advance the sectionalized laminate strip structure in the dispenser. If a sprocket drive is used, the sectionalized laminate strip structure must be processed to include sprocket holes as previously described to accommodate such sprockets.

An adjustable photoconductive cell 17 and light source 18 (not specifically shown) adapted to start and stop a motor or the like which is drivingly engaged to feed rolls 15, 16 is used to control the distance the sectionalized laminate strip structure is to be advanced. The photoconductive circuit is also adapted to lock feed rolls 15, 16 in place when they are at rest. The photoconductive cell 17 and light source 18 is adjusted so that only a single laminated sheet article consisting of layers 19 and 20 will be advanced the correct distance to the protruding position shown as 19', 20' in readiness for removal from the dispenser as shown in FIG. 3. Because the integrity of the sectionalized laminate strip structure is intact, 19' and 20' remain in the protruding position until grasped and removed from the dispenser by the user. When the laminated sheet article consisting of 19' and 20' is removed from the dispenser by the user, it separates from adjoining layers 19 and 20 because laminated sheet article 19 and 20 is locked in position between feed rolls 15, 16 and because the pull exerted by the user on the laminated sheet article overcomes or exceeds the adherent force between pressure sensitive adhesive coated sheet article 19' and releasably coated sheet article 20. Laminated sheet article 21, comprising layers 19" and 20" illustrates said article separated from the sectionalized laminated strip structure.

When the laminated sheet article 19', 20' is removed from the dispenser the photoconductive circuit is activated which in turn causes feed rolls 15, 16 to unlock and advance laminated sheet article 19, 20 into the protruding ready position shown as laminated sheet article 19', 20' in FIG. 3. This cycle is repeated each time a laminated sheet article such as 21 is removed from the dispenser, until the laminated sheet articles are exhausted.

When the cuts or perforations in the upper and bottom layers are made in accordance the previously mentioned requirements with respect to the angle of cut and the percentage of overlap of pressure sensitive adhesive coated sheet section 19' with respect to releasably coated sheet section 20' as shown in FIG. 3, the protruding laminated sheet consisting of layers 19' and 20' does not have the undesirable exposure, drying out, or contamination of the adhesive on the pressure sensitive adhesive coated sheet section 19' as long as the laminated sheet 19', 20' remains in the protruding position. Furthermore, the invention permits the user to grasp and remove the laminated sheet article 21 without contamination of the adhesive on the pressure sensitive adhesive coated sheet section 19", because the adhesive on pressure sensitive adhesive coated sheet section 19" cannot become exposed until separation of laminated sheet article 21 comprising sheet layers 19", 20" from laminated sheet layers 19' and 20' occurs. Removal from the dispenser of the laminated sheet articles may also be effected simply by grasping the exposed leading edge of releasably coated sheet section 20' between thumb and forefinger and pulling.

Figure 4:
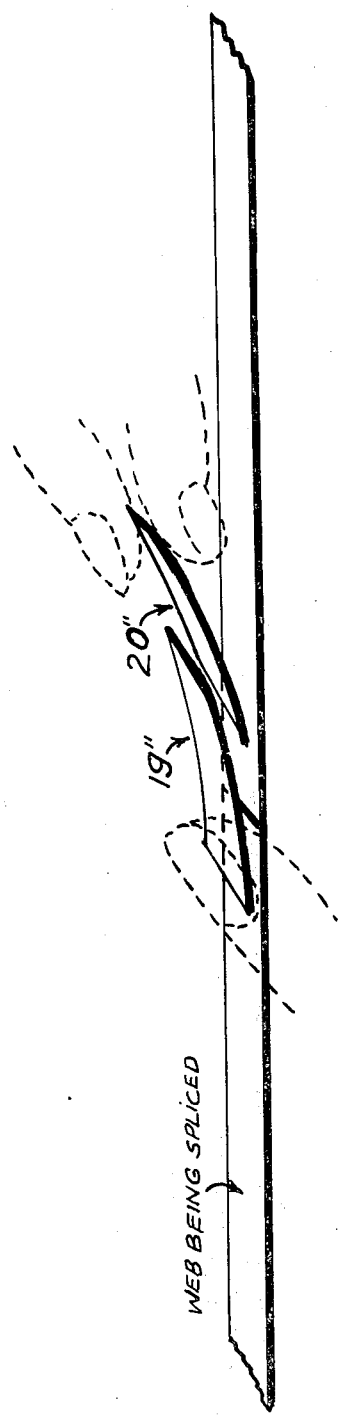
FIG. 4 is a perspective view showing one means of application of the pressure sensitive adhesive backed sheet article made in accordance with the present invention.
Figure 5:
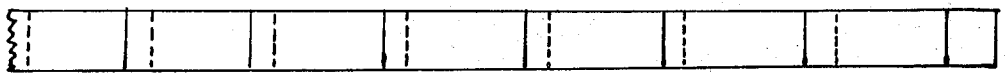
FIGS. 5 to 13 are top views of sectionalized laminate strip structures showing various configurations of the first and second layers.
Figure 6:
Figure 7:
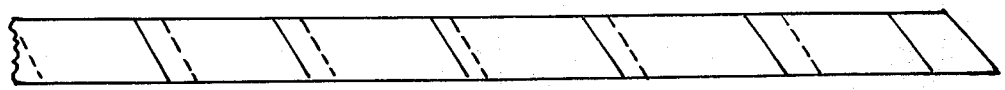
Figure 8:
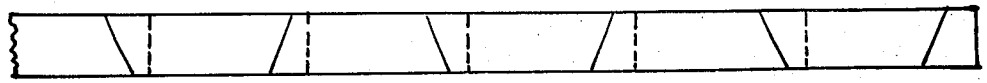
Figure 9:
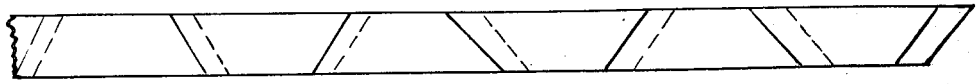
Figure 10:
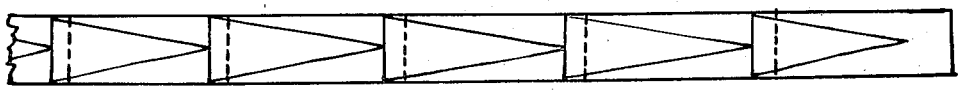
Figure 11:
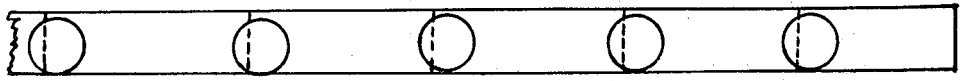
Figure 12:
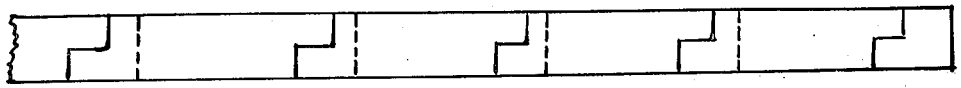
Figure 13:
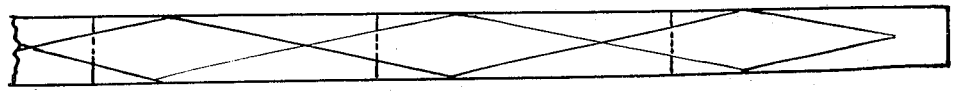

A convenient means of applying the removed laminated sheet article to a section of sound tape to be spliced is shown in FIG. 4.

The exposed end containing adhesive of the recently removed laminated sheet sections 19", 20" is applied to one end of the sound tape to be spliced, and is pressed down to allow the exposed adhesive on the pressure sensitive adhesive coated sheet section 19" to make a good bond. At the same time, the releasably coated sheet section 20" is removed by pulling, while maintaining pressure on the adhesive coated sheet section 19", then pressing the entire strip down on the sound tape, completing the splice.

As may be seen, this procedure allows for the positioning and application of the pressure sensitive adhesive coated sheet 19" in a convenient manner without contamination of the adhesive by the user. These sheet articles may be applied to a number of other items in the same manner or fashion.

In accordance with the present invention, many variations of shapes or configurations of cuts in both the pressure sensitive adhesive coated upper tape layer and the releasably coated lower layer of the sectionalized laminate strip structure are possible, to suit specific end uses other than splicing tabs, for example, labels and markers. Examples of such variations which do not destroy the integrity of the sectionalized laminate strip structure and which conform to the previously mentioned specifications on amount of overlap of upper layer sheet sections to bottom layer sheet sections are shown in FIGS. 5 to 13 wherein the solid lines represent the perforations in the top layer, and the dotted lines represent the perforations in the bottom layer.

In the preferred embodiment used in this invention the first or upper layer comprises a laminate of Aluminum foil, and Polyester film coated with a pressure sensitive adhesive on the bottom side of the polyester film surface which is in contact with the second or lower layer.

Other substantially flexible sheet-like materials such as metal foil, cloth, paper, plastics either singly or in laminated combinations and coated with a pressure sensitive adhesive may be used to suit specific end uses and can be used in the present invention.

The second or lower layer preferably comprises a paper having a release coating on the side of it which is in adherent contact with the upper or first layer. The bottom layer may also comprise other substantially flexible sheet materials made from metal foil, cloth or plastics (having a release layer or inherent release properties) which may be usued also either singly or in laminated combinations. The preferred paper to be used in the present invention is a semi-bleached super-calendered densified kraft paper having a continuous silicone rubber polymer release coating on at least one side.

The pressure sensitive adhesive systems which can be used in the present invention are any of the standard pressure sensitive adhesives having as a base sucuh materials as natural rubber, acrylic polymers neoprene, butyl rubber, silicone rubber, wax or wax and rubber mixtures.

I claim:

1. A sectionalized laminate strip structure comprising:
a substantially flexible first layer comprising a longitudinal sheet material coated with pressure sensitive adhesive on one side;
a substantially flexible second layer comprising a sheet material having a release coating on one side;
said first layer being superimposed on said second layer such that said pressure sensitive adhesive on said first layer is in adherent contact with the release coating on said second layer;
said first layer having longitudinally spaced weakened portions extending transversely substantially across the full width hereof to form said first layer into a plurality of longitudinally distributed detachable first sections;
said second layer having longitudinally spaced weakened portions extending transversely substantially across the full width thereof to form said second layer into a plurality of longitudinally distributed detachable second sections;
said weakened portions of said first layer being out of alignment with respect to said weakened portions of said second layer;
each of said first sections having a substantial portion thereof overlying and adhered to a corresponding portion of one of said second sections, and the remaining portion of said first sections overlying and adhered to a corresponding portion of another second section positioned adjacent to said one of said second sections; such that when an initial first section, having a portion of an initial second section adhered thereto, is detached from a portion of the next adjacent second section, the corresponding adhesive surface which is exposed is placed on material to be joined and the said initial second section is removed by application of shear force whereupon pressure is applied to said first section to totally adhere it to the material to be joined.

2. The sectionalized laminate strip structure defined in claim 1 wherein said longitudinally spaced weakened portions on said first and second layer are severed.

3. The sectionalized laminate strip structure defined in claim 1 wherein said longituduinally spaced weakened portions on said first and second layer are perforated.

4. The sectionalized laminate strip structure defined in claim 2 wherein a major portion of each of said first sections overlies and is adhered to said one of said second sections.

5. The sectionalized laminate strip structure defined in claim 4 wherein between 50 and less than 100% of each of said first sections overlies and is adhered to said one of said second sections.

6. The sectionalized laminate strip structure defined in claim 4 wherein between 60 and 90% of each of said first sections overlies and is adhered to said one of said second sections.

7. The sectionalized laminate strip structure defined in claim 4 in which said first and second layer are severed normal to their edges.

8. The sectionalized laminate strip structure defined in claim 4 in which said first and second layer are severed at angle of 30° or greater to less than 90° to their edges.

9. The sectionalized laminate strip structure defined in claim 4 in which said sections are severed to form parallelogram configurations.

10. The sectionalized laminate strip structure defined in claim 7 wherein said first layer is aluminum laminated to polyester and said second layer is a silicone kraft paper.

References Cited
UNITED STATES PATENTS

| | | | |
|---|---|---|---|
| 2,765,205 | 10/1956 | Capelle et al. | 161—406 X |
| 3,519,525 | 7/1970 | Jackitedt | 161—406 X |
| 3,663,343 | 5/1972 | Buck | 161—406 X |

GEORGE F. LESMES, Primary Examiner

W. E. BALL, Assistant Examiner

U.S. Cl. X.R.

161—38, 39, 112, 145, 167, 406; 156—268; 206—59; 117—6; 40—2